L. J. STEPHENSON.

DYNAMO ELECTRIC MACHINERY.

APPLICATION FILED DEC. 10, 1919.

Reissued Jan. 6, 1920.

14,787.

5 SHEETS—SHEET 1.

Inventor
Leigh J. Stephenson

William, Bradbury & See
Attys.

Earl A. Pierce

L. J. STEPHENSON.

DYNAMO ELECTRIC MACHINERY.

APPLICATION FILED DEC. 10, 1919.

Reissued Jan. 6, 1920.

14,787.

5 SHEETS—SHEET 2.

Inventor
Leigh J. Stephenson

Earl R. Pierce

Williams, Bradbury & See
Attys.

L. J. STEPHENSON.

DYNAMO ELECTRIC MACHINERY.

APPLICATION FILED DEC. 10, 1919.

Reissued Jan. 6, 1920.

14,787.

5 SHEETS—SHEET 3.

Inventor
Leigh J. Stephenson

Earl G. Price

Williams, Bradbury & See
Attys.

L. J. STEPHENSON.

DYNAMO ELECTRIC MACHINERY.

APPLICATION FILED DEC. 10, 1919.

Reissued Jan. 6, 1920.

14,787.

5 SHEETS—SHEET 4.

Inventor
Leigh J. Stephenson

Earl A. Pierce

Williams, Bradbury & See
Attys.

L. J. STEPHENSON.

DYNAMO ELECTRIC MACHINERY.

APPLICATION FILED DEC. 10, 1919.

Reissued Jan. 6, 1920.

14,787.

5 SHEETS—SHEET 5.

Inventor
Leigh J. Stephenson

William, Bradbury & Seg
Attys.

Earl A. Pierce

UNITED STATES PATENT OFFICE.

LEIGH J. STEPHENSON, OF CHICAGO, ILLINOIS, ASSIGNOR OF ONE-HALF TO GEORGE H. BURRAGE, OF CHICAGO, ILLINOIS.

DYNAMO-ELECTRIC MACHINERY.

14,787. Specification of Reissued Letters Patent. Reissued Jan. 6, 1920.

Original No. 1,322,471, dated November 18, 1919, Serial No. 297,420, filed May 15, 1919. Application for reissue filed December 10, 1919. Serial No. 343,801.

*To all whom it may concern:*

Be it known that I, LEIGH J. STEPHENSON, a citizen of the United States, residing at Chicago, in the county of Cook and State of Illinois, have invented a certain new and useful Improvement in Dynamo-Electric Machinery, of which the following is a full, clear, concise, and exact description, reference being had to the accompanying drawings, forming a part of this specification.

This invention relates to improvements in dynamo electric machinery, and is especially concerned with improvements in dynamos which are intended to be used either as generators or motors, my invention being particularly applicable to dynamos which are to be used as motors for driving vehicles or mechanisms which are frequently started and stopped, or which are subject to variation in speed. For economical reasons it is very desirable where the apparatus to be driven is of the type referred to above, and where the amount of power consumed is considerable, that the dynamo should operate as a generator when it is desired to stop the apparatus or to reduce the speed, thereby returning current to the line from which the dynamo, while functioning as a motor, receives its supply of current.

Various expedients have heretofore been suggested for controlling a dynamo to function as a motor, to drive certain apparatus, and to function as a generator when it is desired to stop or reduce the speed of the apparatus, the dynamo for this purpose acting as a dynamical braking means for effecting the desired reduction in speed. For various reasons these expedients have proved undesirable in many instances, and especially so where it is desired that the dynamo, when functioning as a motor, should have the characteristics of a series wound motor. This is due to the fact that the apparatus heretofore required for producing an apparatus having the necessary or desired characteristics has been very complicated, of high initial cost, and the maintenance cost has been excessive. Furthermore, it has been found impossible with apparatus heretofore in use, to provide for more than two or three braking rates without the use of complicated and costly auxiliary controlling apparatus.

Although it has long been recognized by railway engineers that the characteristics of a series wound motor are not the most desirable characteristics which a motor for this service could possess, up to the present time no means have been provided for producing a motor having characteristics that are more desirable than those of a series motor. My invention, more specifically speaking, relates to means for providing a motor having characteristics that are more universally desirable for electric railway operation and other similar service.

My invention also relates to improvements in dynamo electric machinery which will make it possible for a manufacturer of this kind of apparatus to manufacture a single line of dynamos and to provide control apparatus therefor by means of which these dynamos can be controlled to give any desired characteristic, either of a series shunt or compound wound motor or generator, the control apparatus itself being comparatively small, economical to manufacture, and requiring very small upkeep.

Some of the objects of my invention are:

First: To provide a dynamo and control apparatus therefor, which will function as a motor to drive apparatus with which it is connected, and which will utilize the momentum of the connected apparatus when functioning as a generator, to return power to the power circuit with which it is connected, and at the same time produce a dynamical braking effect upon the apparatus driven thereby;

Second: To provide an apparatus of the type described, by means of which the rate at which current is returned to the power line and the braking effect produced can be regulated as desired;

Third: To provide apparatus of the character described, embodying means whereby the rate of acceleration can be easily and economically controlled, as desired;

Fourth: To provide apparatus as set forth above, which is, comparatively speaking, of simple construction, economical to manufacture, easy to operate, and which has a low maintenance cost;

Fifth: To provide a dynamo which, when functioning as a motor, may be caused to have the operating characteristics of either a shunt, series or compound wound motor, as desired, or may be given operating characteristics different from the operating characteristics of a shunt, series or compound wound motor;

Sixth: To provide a dynamo of the type referred to, which, when functioning as a motor, has operating characteristics similar to those of a series wound motor, and of such construction that when operating as a generator its voltage may be controlled as desired, to effect any desired rate of dynamic braking;

Seventh: To provide a shunt wound dynamo with control apparatus whereby it may be caused to function as a motor having the characteristics of a series wound motor;

Eighth: To provide a motor with means for regulating the speed thereof, so that the speed may be changed by imperceptible gradations;

Ninth: To provide a motor having an infinite number of speeds between its low and high speeds;

Tenth: To provide an adjustable speed motor having a large speed range;

Eleventh: To provide a dynamo which, when functioning as a motor, may be controlled to give various speeds between its low and high speed, without the use of resistance or contacts carrying heavy currents;

Twelfth: To provide a dynamo of the character described, the speed of which can be easily controlled from a distance;

Thirteenth: To provide a dynamo with control apparatus by means of which its operating characteristics may be easily and quickly varied or modified; and Fourteenth: To provide a dynamo, the operating characteristics of which can be varied or modified as desired, while operating.

Other objects will appear as this description progresses, reference being had to the accompanying drawings, in which—

Figure 1 discloses in a more or less conventional manner a dynamo designed to drive a street car or other vehicle, or apparatus, equipped with a regulating dynamo showing the driving connection between the motor and the regulating dynamo;

Throughout the several views similar reference characters refer to similar parts.

Figure 1:
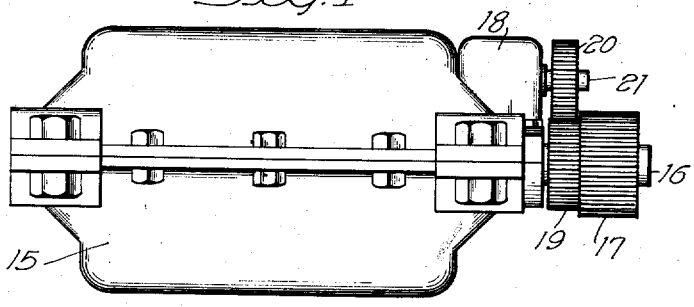
Figure 2:
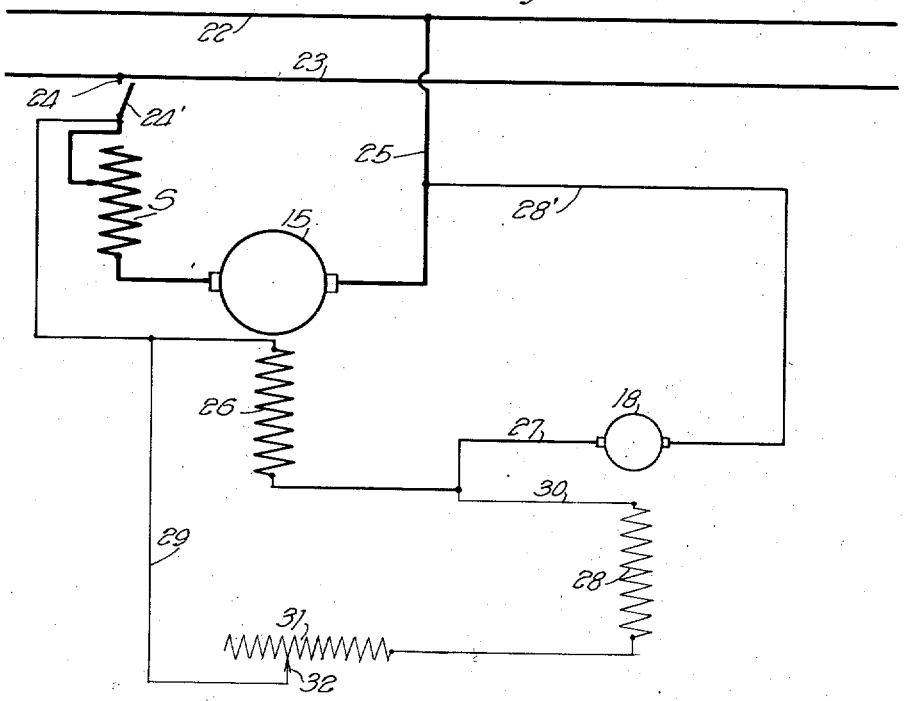
Fig. 2 is a diagram of the electrical connections between the various parts of my apparatus.

Referring to the drawings, and for the present to Figs. 1 and 2, the reference character 15 indicates in a more or less conventional manner a dynamo, which is illustrated in the form of a motor designed to drive a street car or other similar vehicle. This dynamo is provided with an armature shaft 16 to one end of which is secured a spur gear 17, designed to mesh with a suitable gear on the axle of the vehicle or apparatus to be driven. Mounted upon the end of the casing of the dynamo 15 adjacent the spur gear 17 is a small regulating dynamo 18. For the purpose of distinguishing between the regulating dynamo and the larger dynamo 15, the latter will be termed a power dynamo. The dynamo 18 is driven at a speed bearing a constant proportionality to the speed of the armature shaft, by means of a gear 19 secured to the shaft 16, which meshes with a gear 20, secured to the shaft 21 of the regulating dynamo.

Referring to Fig. 2, the dynamo 15 is shown connected directly across the mains 22 and 23, by means of conductors 24 and 25, a suitable starting resistance S being connected in series with the dynamo 15. The conductor 24 includes a switch 24′, for controlling the circuit of the dynamo 15. The reference character 26 indicates the shunt field of the dynamo 15, one end of which is connected with the conductor 24 on the motor side of the switch 24′. The other end of the shunt field 26 is connected by means of the conductor 27 with one terminal of the regulating dynamo 18. The other terminal of the dynamo 18 is connected by means of the conductor 28′ with the conductor 25. By means of the connections just described, the field 26 and the armature of the regulating dynamo are connected in series with each other, and across the lines 22 and 23. The reference character 28 indicates the field of the regulating dynamo 18. The field 28 is connected around or in parallel with the shunt field 26 of the power dynamo by means of the conductors 29 and 30. An adjustable rheostat 31 is included in the circuit of the field 28 of the regulating dynamo 18. The regulating dynamo 18 is connected with the shunt field 26 of the power dynamo in such a manner that its voltage, that is, the voltage of the regulating dynamo, opposes the voltage impressed upon the shunt field of the power dynamo by the mains 22 and 23.

For the purpose of explaining the operation of my apparatus it will be assumed that the dynamo 15 is to be used for driving a motor vehicle such as a street car or automobile. It is very desirable that the motor used for driving apparatus of this kind should be a series motor or at least should have characteristics similar to a series motor on account of the exceedingly high starting torque developed by a motor of this kind and on account of its rapid acceleration.

The dynamo 18 is so connected with the shunt field of the dynamo 15 and the line wires that its voltage opposes the voltage imposed on the line wires. In starting a vehicle equipped with my improved apparatus the adjustable member 32 of the rheostat 31 is manipulated toward the left in Fig. 2 to open the circuit of the field 28 of the dynamo 18, thereby reducing the excitation of this dynamo to substantially nothing, and consequently reducing the voltage of the dynamo 18 to its lowest possible voltage. The starting resistance S is cut in and the switch 24′ is then closed, whereupon the full line voltage reduced by the starting resistance S is imposed upon the terminals of the dynamo 15 and full line voltage imposed upon the shunt field of this dynamo. Since the armature 15 is at rest a very heavy current flows therethrough, and since the armature 18 is at rest it does not produce any electromotive force to oppose the passage of current through the shunt field 26 of the dynamo 15, and consequently the maximum current flows through the field 26. By reason of the heavy currents in the armature and field of the dynamo a large starting torque is developed. The armature of the dynamo 15 will speed up under this large torque and in the absence of the dynamo 18, would accelerate in substantially the same manner as the shunt dynamo. However, as the dynamo 18 is in geared connection with the dynamo 26 its armature will speed up at the same rate as that of the dynamo 15. If, after closing the switch 24′ and thus starting the dynamo 15 as a motor, the operator immediately moves the contact 32 of the rheostat toward the right, the resistance of the rheostat 31 is gradually cut out, thereby gradually increasing the field strength of the dynamo 18. At the same time the speed of the armature of the dynamo 18 is gradually increased and as a result of these increases in the excitation of the field of the dynamo 18 and the speed of its armature, the voltage of the dynamo picks up at a rapid rate. As this voltage opposes the voltage imposed upon the field 26 of the dynamo 15 the field strength of the dynamo 15 is decreased at a rapidly accelerated rate. The result of this is that the speed of the armature 15 is accelerated at a much greater rate than it would be in the absence of the dynamo 18. As a matter of fact, the acceleration curve of my dynamo functioning as a motor and regulated as described resembles that of a series motor. It will, of course, be obvious that the rate of acceleration depends upon the rate at which the movable contact 32 of the rheostat 31 is moved toward the right.

The voltage or counter-electromotive force of the dynamo 18 and the line voltage should bear such a relation to each other that when all of the resistance of the rheostat 31 is cut out the difference between these two voltages will cause the proper amount of current to flow through the shunt field 26 to cause the armature of the dynamo 15 to rotate at the desired highest speed.

When it is desired to decrease the speed of, or stop a vehicle, equipped with my apparatus, the movable contact 32 of the rheostat 31 is moved to the left-hand side of the rheostat 31 so as to cut in some or all of the resistance of this rheostat, depending upon the braking rate desired. This causes a decrease in the current flowing through the field 28 and correspondingly decreases the voltage generated by the dynamo 18. The current flowing through the field 26 immediately increases, thereby causing an increase in the saturation of the field dynamo 15. This dynamo thereupon ceases to function as a motor and starts to function as a generator, the momentum of the vehicle supplying power for driving the dynamo as a generator. As the power delivered to the line by the generator must be furnished by the momentum of the vehicle the speed of the armature of the dynamo 15 and consequently of the vehicle decreases until the voltage of the dynamo 15 becomes equal to or slightly less than that of the line, whereupon the dynamo 15 again functions as a motor and continues to drive the vehicle at a reduced speed. When the vehicle is running, by completely opening the circuit of the field 28 the voltage of the generator 18 is reduced to practically nothing and the full voltage of the line is imposed upon the shunt field 26, and the speed of the dynamo 15, and consequently of the vehicle, is reduced to that speed at which the dynamo with its field fully excited, generates a voltage slightly less than that of the line. To bring the vehicle to a complete stop brake mechanism of some sort may be employed.

The speed of the armature of the dynamo 15 can be changed from its lowest speed to its highest speed by simply moving the contact 32 from the lefthand end of the rheostat 31 to the righthand end thereof, and to decrease the speed of the dynamo this operation is merely reversed. The resistance elements of the rheostat 31 can be so proportioned that the changes in the speed of the dynamo 15 due to the shifting of the movable contact 32 may be made by imperceptible gradations.

In order to further explain the operating characteristics and the advantages of my improved apparatus, I have illustrated herewith a set of curves which I shall now explain. These curves illustrate the performance of the power dynamo functioning as a motor.

In this figure (Fig. 3) the curves A, B and C show the change in speed of the motor with change in voltage applied to the terminal of the motor field winding. Curve B shows the changes in speed with zero armature current. This curve was obtained by driving the motor at such a speed as to reduce the armature current to zero. Curve A represents the speed of the motor while carrying full load current with different potentials applied to its field terminals, and curve C indicates the speed of the motor at full load braking current. Lines *d* to *k* inclusive correspond to different settings of the rheostat 31, and serve to indicate two things, namely, the voltages generated by the regulating dynamo 18 and the voltages applied to the field terminals of the motor. The distance between the line Y—*d* and the line O—*x* is a measure of the voltage across the motor field terminals when the field circuit of the dynamo field 28 is opened. Under this condition the voltage applied to the motor field is practically equal to full line voltage. The distances between the intersections of the curves A, B and C and the line Y—*e* and the axis O—*x* are measures of the voltages applied to the motor field terminals, and the distances between the same intersections and the line Y—*d* are measures of the voltages generated by the regulating dynamo for the same setting of the rheostat 31. In a similar manner the distances between the intersections of the remaining lines *e* to *k* inclusive and the lines A, B and C and the line O—*x* and Y—*d* are measures of the voltages applied to the motor field terminals and the voltages generated by the regulating dynamo. The lines *d* to *k* inclusive correspond to setting of the rheostat 31, which give equal increments of ampere turns in the regulating dynamo field winding.

With a setting of the rheostat corresponding to the line Y—*e*, at no load, or rather with zero armature current the speed of the motor is approximately 560 R. P. M. As the load on the motor is increased the speed will gradually decrease, until when the motor is carrying full load current, its speed will have dropped back along the line Y—*e* to the intersection of this line with the full load curve A, which is approximately 450 R. P. M. If the motor should be considered as driving a vehicle, and it should encounter a down grade, the speed would increase along the line Y—*e*, until at the intersection of this line with the line C, it would be generating full load braking current. In the same manner the speed of the motor for any given setting of the rheostat or its braking current can be determined by reference to the points of intersection of the lines representing the different rheostat settings with the curves A, B and C. By shifting the rheostat from the point corresponding to the line Y—*j* toward the point corresponding to the line Y—*d*, any desired rate of braking can be produced. If the rheostat is shifted from the first mentioned position to the last mentioned position, more quickly than the speed of the motor can decrease to the value indicated by the intersection of the line Y—*d* and C, the braking current will exceed the full load braking current of the main dynamo. On the other hand, if the rheostat is shifted toward the position indicated by the line Y—*d* at the proper rate, the motor can be made to return current to the line at its full load rate while the speed of the vehicle is decreasing from its highest speed to its lowest speed, indicated by the intersection of the line Y—*d* and the curve C.

It will be noted from an inspection of these curves that the lines representing the various rheostat settings intersect the curves A, B and C but once. This is a most important feature of my invention, for the reason that if any one of the lines representing the rheostat settings should intersect the same curve, either A, B or C twice, there would be a setting of the rheostat at which the line representing this setting would become tangent to the curve A, B or C, as the case may be, and any further shifting of the rheostat to produce a higher speed would cause the speed of the motor to become unstable, and it would rapidly increase, taking more and more current, until the motor would either burn out, or wreck itself, due to high speed.

Another important feature of my apparatus resides in the fact that the strength of the motor field increases as the load upon the motor increases. This is clearly illustrated by the curves shown in Fig. 3. Take, for instance, the line Y—*i*, the maximum speed of the motor corresponding to this rheostat setting at no load, which is approximately indicated by the intersection of this line with the line B, is approximately 1270 R. P. M., and at this speed the voltage over the motor field is approximately 66 volts. As the load increases the speed drops back along the line Y—*i* until the load has been increased to full load, when its speed will have decreased to approximately 600 R. P. M. At this speed the voltage across the motor field terminals is approximately 118 volts. In other words, in decreasing from a no load speed of 1270 to a full load speed of 600, the voltage over the motor field terminals has almost doubled.

Figure 3:
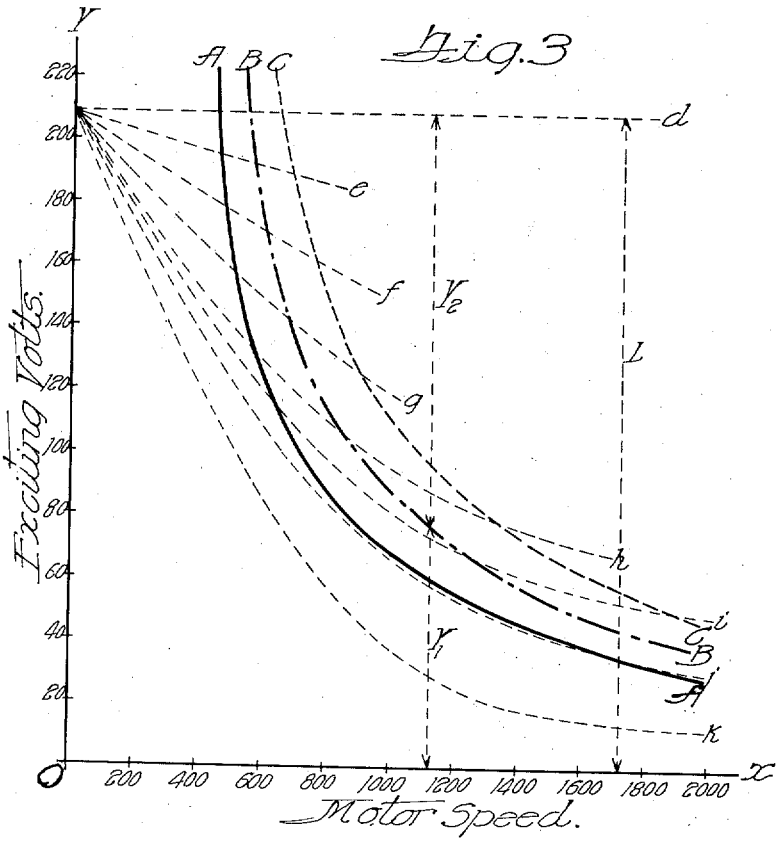
Fig. 3 is a set of curves illustrating certain operating characteristics of the apparatus disclosed in Figs. 1 and 2.

Referring again to the curves shown in Fig. 3, it will be noted that the voltage which the dynamo must generate in order to cause the motor to speed up under any load condition must initially increase at a very much faster rate than the speed of the motor. This will be made clear by reference to curve A. It will be noted that under full load, while the speed of the motor is increasing from, say 500 R. P. M. to 800 R. P. M., the voltage of the regulating dynamo increases from approximately 50 volts to 122 volts. The increase in speed is 60 per cent., whereas the increase in voltage of the dynamo is 142 per cent.

It will readily be seen that if the voltage of the dynamo should continue to increase at a greater rate than the speed of the motor increases, the field of the motor would decrease at a rate greater than the speed of the motor increases, and the motor would take a continuously increasing amount of current at an increasing speed. The speed of the regulating dynamo would increase with the speed of the motor, until a point would be reached where it would generate a counter-electromotive force equal to line voltage, and since this counter-electromotive force opposes the line voltage impressed upon the motor field winding, the motor field would be reduced to zero. In order, therefore, to prevent the motor from running away and burning out, it is necessary to provide some means which will, after the motor has reached a certain speed, cause the speed of the motor to increase at a faster rate than the voltage of the dynamo increases.

That I have provided such a means will be apparent from a further study of these curves, and to illustrate this I will refer to the portion of the curves extending beyond 1000 R. P. M. Referring again to the full load curve, as the motor speeds up from 1000 R. P. M. to 1600 R. P. M., which is an increase of 60 per cent. in speed, the voltage of the dynamo increases from 142 to 170 per cent., or an increase in voltage of 19.7 per cent.

From these figures it will be seen that while the speed of the motor is increasing 60 per cent., the voltage of the regulating dynamo is increasing but 19.7 per cent.

From the above it will be seen that the dynamo voltage necessary to raise the motor speed through successive values must increase faster than its speed increases, until the knee of the curve is reached, which is at about 900 R. P. M. At this speed for an infinitesimal space, the dynamo field need not be changed, as the dynamo voltage is increasing at the same rate as its speed. Beyond this point the dynamo voltage must increase at a lesser rate than its speed increases. Since the dynamo voltage is proportional to the product of its speed and field strength, this means that the dynamo field must from this point be gradually decreased.

In order, therefore, to get the full speed range of the motor, the dynamo field must be increased up to a certain point, and then decreased for any further increase in speed. To accomplish this result I provide a field winding for the regulating dynamo, which includes a rheostat, and which is connected in parallel with the motor shunt field. With this arrangement the gradual decrease in the strength of the dynamo field is automatically accomplished, for at the higher speeds the voltage of the dynamo field circuit is dropping, due to the fact that the current through the motor field is decreasing, and consequently the voltage over the dynamo field is actually decreasing, in spite of further decrease of the rheostat resistance. This makes the action continuous and inherent, and the higher speed settings are readily obtained regardless of load conditions.

As stated above, there is a point at which there is no change in the strength of the dynamo field. In other words, this is the point at which the field of the dynamo ceases to increase. I shall now determine this speed by reference to curve B of Fig. 3, this curve being used for the reason that it is the no current curve of the motor, and simplifies the calculations required to determine this point.

If flux values in the magnetic field circuit of a direct current motor are plotted against the motor speeds corresponding to each of these flux values, the resulting curve is an equilateral hyperbola. If in place of flux values, the voltage impressed upon the terminals of the motor field winding are plotted, the resulting curve is almost identical with the curve obtained by plotting flux values against speed values, the only difference being that by reason of the effect of the magnetization curve of the iron forming the magnetic field of the motor, one end of the curve is slightly distorted. The curves A, B and C of Fig. 3 show the relation between the motor speed values and the voltage impressed upon the motor field winding to obtain these various speeds. The upper ends of these curves are, due to the above mentioned effect of the magnetization curve of the iron and field circuit, bent slightly away from the axis of zero speed. There are certain other things which slightly distort the curves A and C, such, for instance, as armature reaction and armature I R drop, which do not affect curve B, and since, therefore, curve B more nearly approximates a true equilateral hyperbola, I shall use it for the present demonstration.

Now let $\varphi$ equal the field flux of the regulating dynamo, S equal the speed in R. P. M. of both the dynamo and motor, L equal line voltage, C equal the winding constant of the dynamo in the equation. $V_2$ equals $C\varphi S$ where $V_2$ equals the volts generated by the dynamo; that is, its counter-electromotive force. And let $V_1$ equal the volts required at the motor shunt field terminals. The equation of an equilateral hyperbola is $$V_1S=K^2 \quad (1)$$

This is the equation of the curve B referred to the axes O—$y$ and O—$x$. This is the equation of the curve which is the locus of the values of the voltages applied to the motor field terminals for different speeds. The voltages generated by the dynamo equal the differences between line voltage and the various voltages applied to the motor field terminals, or $$V_1=L-V_2 \quad (2)$$

Substituting this value of $V_1$ in (1), $$SL-SV_2=K^2 \quad (3)$$

but $$V_2 \text{ equals } C\varphi S \quad (4)$$

or, substituting this value of $V_2$ in equation (3), $$SL-C\varphi S^2=K^2 \quad (5)$$

$$\phi=\frac{SL-K^2}{CS^2}=\frac{L}{CS}-\frac{K^2}{CS^2} \quad (6)$$

Differentiating the equation (6) to find the maximum value of $\varphi$, that is, where it starts to decrease, $$\frac{d\phi}{dS}=\frac{-L}{CS^2}+\frac{2K^2}{CS^3} \quad (7)$$

Placing this derivative equal to zero, $$\frac{2K^2}{CS^3}-\frac{L}{CS^2}=O,$$

or $$\frac{2K^2}{C}-\frac{LS}{C}=O,$$

and $$2K^2=LS,$$

or $$S=\frac{2K^2}{L} \quad (8)$$

Therefore, the speed at which the field of the dynamo is at its maximum value is equal to $$\frac{2K^2}{L}.$$

Substituting this value of S in the equation, $$V_1S=K^2$$

$$\frac{2V_1K^2}{L}=K^2,$$

or $$V_1=\frac{L}{2}. \quad (9)$$

In other words, the dynamo field reaches its maximum value when the voltage over the motor field terminals equals one-half the line voltage. It will be noted by reference to the equation (8) that the critical speed is independent of the dynamo design, and also independent of the relative speed of the motor and dynamo.

By providing means for decreasing the dynamo field after the motor has reached the critical speed above determined, I am enabled very considerably to extend the working speed range of the motor. Without this means the maximum speed will be reached when the dynamo field is at its maximum value. The speed at this point is as shown above:

$$S=\frac{2K^2}{L}.$$

The minimum speed is at the point where the dynamo field equals zero, and the dynamo voltage is zero. In other words, $$\phi=\frac{L}{CS}-\frac{K^2}{CS^2}=O,$$

or $$\frac{L}{CS}=\frac{K^2}{CS^2},$$

and $$L=\frac{K^2}{S},$$

or $$S=\frac{K^2}{L}. \quad (10)$$

The ratio $$\frac{\text{max. speed}}{\text{min. speed}}=\frac{2K^2}{L}\div\frac{K^2}{L}=2.$$

In other words, if no means are provided for decreasing the dynamo field after this critical speed has been reached, the maximum increase in speed which it is possible to obtain for any design of motor or dynamo and any speed relation between them is one hundred per cent. Practically this increase cannot be obtained. The saturation of the magnetic circuit, armature reaction, and ohmic drop all reduce this amount materially.

Reference to curves A, B and C of Fig. 3 discloses the fact that any change in load from the no load curve, either toward the curve A or toward the curve C, is accompanied by a change in speed. That is, if the mechanical load upon the motor increases from no load, the speed of the motor decreases with increase of load. This decrease in speed will take place along the lines *d* to *k* inclusive, depending upon the setting of the rheostat. In order to obtain an operating characteristic similar to that of a series motor it is necessary that the field of the motor shall increase with decreased speed. That I provide such means is shown in Fig. 3, for with any one setting of the rheostat the voltage over the motor field increases with increase in load, or decrease in speed. The amount of this increase in the voltage over the motor field terminals is determined by the slope of the lines *d* to *k* inclusive, with respect to the curves A, B and C, and the distances between the curves A, B and C. It can be seen that if the distance between the curves A and B was materially decreased, it would be necessary, in order to procure the same increase in voltage over the motor field terminals, to materially increase the slope of the lines *d* to *k* inclusive, that is, the upper portions of these lines would have to extend almost perpendicularly. As the means which I have provided for producing the lines *d* to *k* inclusive cannot materially increase the slope of these lines, it becomes necessary to provide means for spacing the lines A, B and C material distances from each other. This means in the apparatus just described is the armature resistance, which, as in any shunt motor, decreases the counter-electromotive force necessary to be generated by the armature with increase in load, and thereby causes the speed to decrease with increase in load.

The apparatus described above is described and claimed in my co-pending application Serial No. 257,573, filed October 10, 1918, of which this application constitutes a continuation in part.

Figure 4:
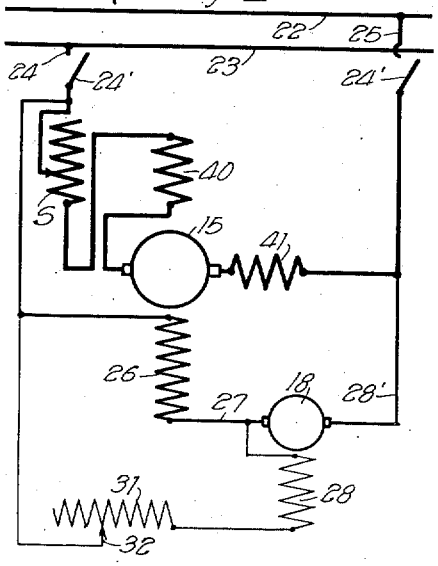
Figs. 4, 5, 6, 7 and 8 are more or less schematic wiring diagrams illustrating certain modifications or variations of the electrical connections illustrated in Fig. 2.

In some cases it will be found undesirable to make the armature resistance of sufficient value to obtain the reduction in speed just referred to, for the reason that it will lead to excessive armature losses. In order to procure the same result and at the same time avoid this objection, I provide the dynamo 15 with a series field winding 40 (see Fig. 4) connected to assist the shunt field winding 26. This field winding will be of comparatively few turns, but will provide the necessary ampere turns to reduce the speed with load the desired degree.

In my application above referred to I have stated that it is desirable to provide the motors with commutating field windings, and I have illustrated such a winding at 41. By the use of such a field winding the speed range of the motor may be increased considerably without objectionable sparking at the brushes.

In order to procure the lowest running speed of the motor it is necessary completely to open the field circuit of the regulating dynamo 18. Under these conditions the dynamo 18 will generate a slight voltage, due to the residual magnetism in the field of this dynamo, and there will also be a slight armature resistance drop in the regulating dynamo, due to the comparatively heavy current flowing through the shunt field winding of the power dynamo 15. This small counter-electromotive force and the armature resistance drop in the regulating dynamo both reduce the potential effective in sending current through the shunt field winding 26 of the power dynamo, and thus limit to some extent the lowest speed of the power dynamo 15 when functioning as a motor. In order to increase the voltage impressed on the shunt field winding 26 and thus cause the motor to operate at a lower running speed, I provide the regulating dynamo with a second field winding 50 (see Fig. 5), which is connected in shunt to the shunt field winding of the power dyanmo 15 in the same manner that the field winding 28 of the regulating dynamo is connected. The field winding 50 may be designed so that at the lowest running speed of the motor it will produce a reverse magnetic flux in the field circuit of the regulating dynamo, of just sufficient strength to compensate for the armature resistance drop. Before the field can accomplish this result it must, of course, have eliminated the residual magnetism of the regulating dynamo. Under these conditions a full line voltage will be impressed across the shunt field winding 26, and a corresponding speed of the motor 15 is produced. A still lower running speed may be obtained by making the field winding 50 of such strength as to cause the regulating dynamo 18 not only to reverse, but to build up a voltage in a direction to assist the line voltage to impress a voltage greater than line voltage over the terminals of the shunt field winding 26.

Figure 5:
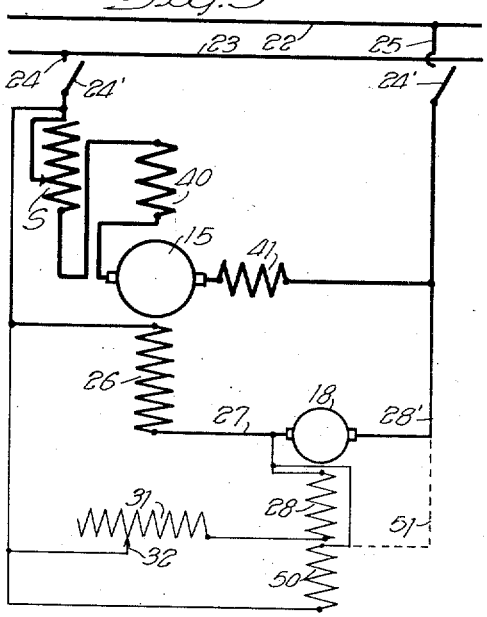
Figure 6:
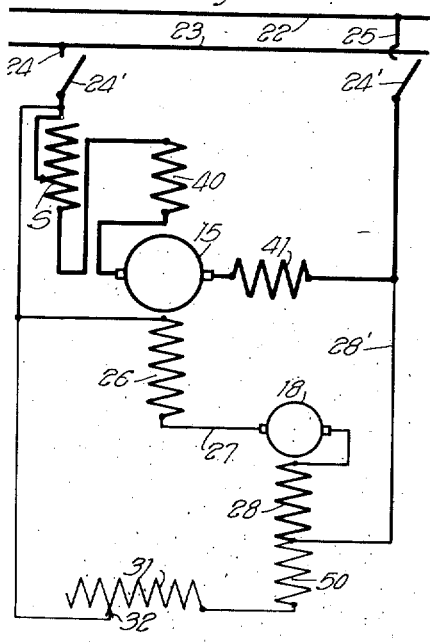

In Fig. 6 I have illustrated a variation of the connections shown in the preceding figures. In this figure the predominating field winding 28 is connected directly in series with the armature of the regulating dynamo and the field winding 26 of the power dynamo. By means of this connection the current in the predominating field winding 28 is varied in proportion to the rate of flow of current in the field winding 26, just the same as it is by the shunt connection illustrated in Fig. 5. In this figure the reversing field winding 50′ of the regulating dynamo is connected directly across the line. With this arrangement the current in the field winding 28 is always the same as that in field winding 26, and the current in the latter field winding cannot, consequently, be reduced to zero. The flux in the regulating dynamo field circuit is due to the resultant magneto-motive force of the two windings 28 and 50′ and can therefore be varied by adjustment of the rheostat 31.

Figure 7:
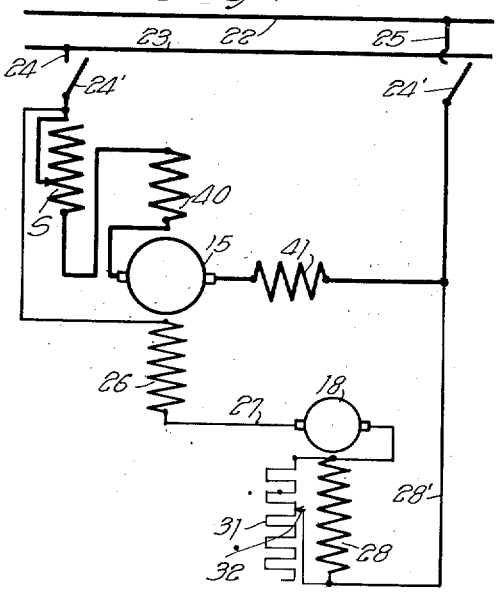

In Fig. 7 I have illustrated different connections by means of which the current in the main field winding 28 of the regulating dynamo can be caused to vary proportionately to the flow of current in the field winding 26 of the power dynamo, and can also be regulated as desired. In this figure the main field winding 28 of the regulating dynamo is shown connected in series with the armature of the regulating dynamo, and the shunt field winding 26 of the power dynamo. This arrangement produces exactly the same result as the shunt connection illustrated in Figs. 2, 4 and 6. The current in the field winding 28 may be regulated by the rheostat 31, which, as shown, is connected in parallel with the field winding 28.

Figure 8:
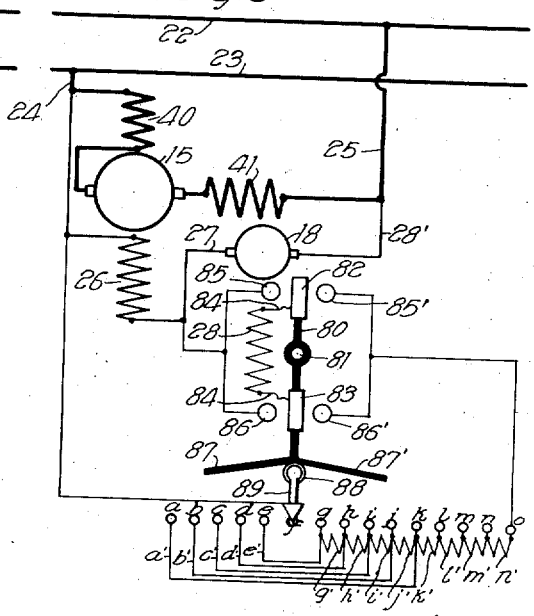

From the above description it will be clear that when the dynamo 15 is functioning as a motor, it could be caused to have a lower stable running speed if some means could be provided for causing the regulating dynamo 18 to reverse its polarity and generate an electromotive force in a direction to assist the line voltage to give the dynamo 15 a very strong field. In Fig. 8 I have illustrated means for accomplishing this result. In this figure the reference character 80 illustrates a lever pivotally mounted at 81 and carrying a pair of contacts 82 and 83, upon opposite sides of the pivot point 81, these contacts being insulated in any desirable manner from each other. The reference character 28 indicates the field winding of the regulating dynamo 18, the terminals of which may be connected by flexible conductors 84 with the movable contacts 82 and 83. Stationary contacts 85, 85′, 86, and 86′ form part of the reversing switch mechanism being described. The lower end of the lever 80 is provided with two laterally extending cams 87 and 87′, which are adapted to be actuated by the roller 88 on the rheostat arm 89. The reference characters *a* to *o* inclusive represent contacts of a rheostat. The contacts *g* to *o* inclusive are connected by means of resistance elements *g′* to *n′* inclusive. Conductors *a′* to *e′* inclusive connect the contacts *a* to *e* inclusive with the contacts *g* to *k* inclusive, respectively.

When the rheostat 89 is in the position indicated in Fig. 8, the field of the regulating dynamo 18 is opened, and the power dynamo is operating at substantially its lowest speed. By moving the rheostat arm 89 to the right, the roller 88, by co-acting with the cam 87′, first causes the lever 80 to tilt in a direction to cause the movable contact 82 to make connection with the stationary contact 85 and movable contact 83, to make connections with the stationary contact 86′. Further movement of the rheostat arm 89 cuts resistance out of the circuit of the field 28, thereby increasing the voltage of the regulating dynamo 18 and thus increasing the speed of the motor 15. If the rheostat arm 89 is moved from the position indicated toward the left, it first co-acts with the cam 87 to tilt the lever 80 in such a manner as to bring the movable contact 82 into electrical connection with the stationary contact 85′ and the movable contact 83 into electrical connection with the stationary contact 86, and upon further movement of the rheostat arm 89 toward the left, current will flow through the field winding 28 in a direction opposite to that in which it flows when the rheostat arm 89 is in contact with the right hand contacts of the rheostat. When the rheostat arm is in contact with the contact *e*, all of the resistance elements *g′* to *n′* inclusive are in series with the field winding 28, but as the arm 89 is moved toward the left, these resistance elements are progressively cut out and the current flowing through the field winding 28 is thus progressively increased. Upon the reversal of the field 28 the dynamo 18 is caused to generate a potential, which assists the line voltage to pass current through the field winding 26 and continued movement of the rheostat arm toward the left causes this current to increase and the speed of the motor 15 correspondingly to decrease.

It will, of course, be understood that the means which I have illustrated for accomplishing the results just discussed are merely illustrative, and any other suitable means may be used for producing the same result. The result produced by this means is substantially the same as that produced by the field winding 50 of Fig. 5.

Figure 9:
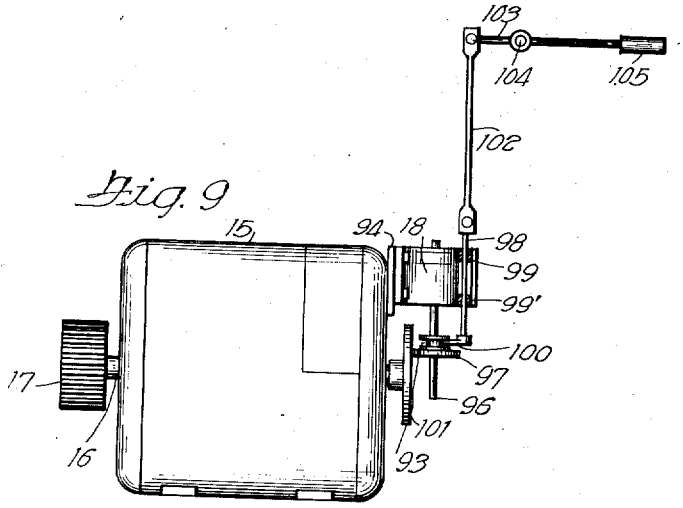
Fig. 9 is a side elevation of apparatus embodying a modified form of my invention.
Figure 10:
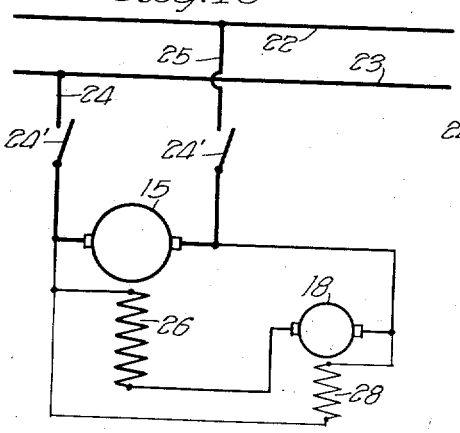
Fig. 10 is a wiring diagram showing one form of electrical connections applicable to the apparatus illustrated in Fig. 9.

In Figs. 9 and 10 I have illustrated a shunt wound dynamo and means for controlling said dynamo to function either as a motor or a generator, the operating characteristics of said dynamo, when functioning as a motor, being similar to the characteristics of a series motor, this apparatus being free from any of the objections to the means heretofore employed for causing a series motor to operate as a generator for either dynamic or regenerative braking. This apparatus is the same as that illustrated in my copending application Serial No. 240,937, filed June 20, 1918, of which my present application constitutes a continuation in part.

Referring to these figures the reference character 15 indicates as a whole a dynamo which is more or less conventionally illustrated, said dynamo comprising an armature shaft 16, to one end of which is secured a driving pinion 17 and to the other end of which is secured a friction disk 93. Mounted upon a support 94 secured to the dynamo frame or to any other suitable support is a small shunt wound regulating dynamo 18 having an armature shaft 96. A friction wheel 97 is splined to the shaft 96 and positioned so that its periphery contacts with the face of the friction disk 93. The friction disk 93 and the movable friction wheel 97 form a well known type of variable speed gear by means of which the speed of the shaft 96 is increased as the friction wheel 97 is moved outwardly from the center of the disk 93 and decreased when the friction wheel 97 is moved in the opposite direction. As means for moving the friction wheel relative to the friction disk I have illustrated a rod 98 slidably mounted in suitable bearings 99 and 99′, one end of said rod being provided with a yoke 100 received in an annular groove 101 in the hub of the wheel 97. A link 102 has its lower end secured to the upper end of the rod 98 and the upper end of the rod 102 is pivotally connected with one end of a lever 103. The lever 103 is pivoted to any suitable support at the point 104 and may be provided with a suitable handle 105.

From the above description it will be apparent that the speed of the dynamo 15 may be varied by imperceptible gradations from zero to its highest speed, and vice versa by merely moving the handle 105 up and down.

By thus changing the speed of the dynamo 15 its counter-electromotive force will be correspondingly increased and decreased by very small increments.

Referring now to Fig. 10, in which I have illustrated the electrical connections of my apparatus, the reference character 15 indicates the dynamo which, as shown, is connected directly across the mains 22 and 23, a switch 24′ being interposed in the circuit of the dynamo, whereby it may be connected and disconnected from the line. The reference character 26 indicates the shunt field of the dynamo 15, which is connected in series with the armature of the dynamo 18, the shunt field 26 and the armature of the dynamo 15 being connected directly across the line. The reference character 28 indicates the shunt field of the dynamo 18.

For the purpose of explaining the operation of my apparatus it will be assumed that the dynamo 15 is to be used for driving a motor vehicle such as an automobile, a street car, or an elevator. It is very desirable that the motor used for driving apparatus of this kind should have characteristics similar to those of a series motor on account of the exceedingly high starting torque developed by a motor of this kind, and on account of its rapid acceleration.

The dynamo 18 is so connected with the shunt field of the dynamo 15 and the line wires that its voltage opposes the voltage imposed on the line wires. In starting a vehicle equipped with my improved apparatus the lever 103 is operated to bring the friction disk 97 to the position adjacent the periphery of the friction disk 93, at which it will be driven at its highest speed. When the switch 24′ is then closed current will pass through the armature of the dynamo 15 and also through the shunt field 26 thereof. Since the armature of the dynamo 15 is stationary the flow of current therethrough will be at a maximum and since the speed of the dynamo 18 at the moment of starting is zero, it will offer no opposition to the passage of current through the shunt winding 26, and consequently the fields of the dynamo 15 now functioning as a motor, will be saturated. The result is that the dynamo 15 functioning as a motor will produce a very large starting torque which will be comparable to that of a series motor of the same power. As the speed of the armature of the dynamo 15 increases the speed of the armature of the dynamo 18 will likewise increase, and the increasing counter-electromotive force of this dynamo will oppose the voltage impressed upon the shunt field 26, and thereby cause the shunt field to be gradually weakened. The weakening of the shunt field results in the acceleration of the armature of the dynamo 15 just as in a series motor. The counter-electromotive force of the dynamo 15 and the line voltage must bear such a relation to each other that at the desired highest speed of the dynamo 15 the differences between these two voltages will cause the proper amount of current to flow through the shunt field to cause the armature of the dynamo 15 to rotate at the desired speed.

When it is desired to stop or decrease the speed of a vehicle equipped with my apparatus the handle 105 is operated to move the wheel 97 toward the center of the disk 93. This will cause a reduction in the speed of the armature of the dynamo 18 and a corresponding reduction in the counter-electromotive force of this dynamo. The current through the field 26 will be correspondingly increased, thereby strengthening the field of the dynamo 15 to such an extent that it will cease functioning as a motor and start to function as a generator, the momentum of the vehicle supplying the power for driving the dynamo as a generator. As the power delivered to the line by the generator must be furnished by the momentum of the vehicle, the speed of the vehicle and consequently of the armature of the dynamo 15 decreases until the voltage of the dynamo 15 becomes equal to or slightly less than that of the line, whereupon the dynamo 15 again functions as a motor and continues to drive the vehicle at a reduced speed. When the vehicle is running, by moving the wheel 97 inwardly to the center of the disk 93, at which point the speed of the armature of the regulating dynamo 18 becomes zero, and the full voltage of the line is imposed upon the shunt field 26, the speed of the dynamo 15 and consequently of the vehicle, can be reduced to that speed at which the dynamo, with its field fully excited, generates a voltage equal to that of the line. To bring the vehicle to a complete stop brake mechanism of some sort must be employed.

The speed of the armature of the dynamo 18 may be gradually changed from zero to its highest speed or vice versa, whereby a corresponding change in the counter-electromotive force of the dynamo 18 will be produced. This change in the counter-electromotive force of the dynamo 18 will produce a corresponding gradual change in the current flowing through the shunt field 26 of the dynamo 15 and thereby gradually change the speed of the dynamo. The dynamo when functioning as a motor will therefore have an infinite number of speeds and a change in speed may be accomplished without causing the vehicle to be driven in a jerking manner, as where the speed of the motor is controlled by the use of resistances or by connecting the motors, if there are a plurality of motors connected in different relations, such as in a series parallel control of street car motors.

Due to the fact that the entire speed control is obtained by regulating the strength of the dynamo field, in services where a wide speed range is desired, it will be advantageous to provide the dynamo with interpoles excited by coils in series with the armature in the usual manner. This will prevent sparking at the commutator, due to armature distortion of a weak field.

Figure 11:
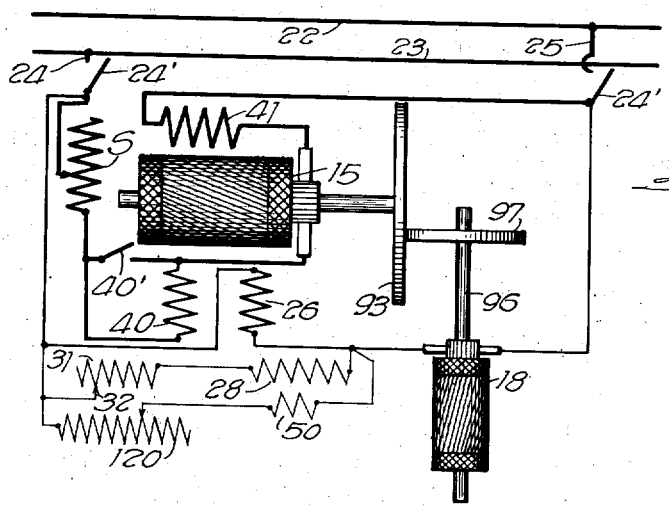
Fig. 11 is a more or less diagrammatical view showing the combined use of the control mechanism illustrated in Figs. 1 and 5 and Fig. 9.

In Fig. 11 I have illustrated apparatus which is substantially a combination of the apparatus illustrated in Fig. 5, with that illustrated in Figs. 9 and 10. The power dynamo 15 is provided with a series field winding 40, a commutating field winding 41, and a shunt field winding 26. The shunt field winding 26 is connected in series with the regulating dynamo 18 and the field winding circuit thus formed is connected across the line wires 22 and 23. The regulating dynamo 18 is provided with a field winding 28, shunted about the field winding 26 of the power dynamo, and with a second reversing field winding 50, likewise shunted around the power dynamo field winding 26. A rheostat 120 may be connected in series with the reversing winding 50 to regulate the effect of this winding if so desired. The power dynamo and the regulating dynamo are shown equipped with a friction disk 93 and a friction wheel 97, respectively, by means of which the speed ratio between the two dynamos can be varied, the apparatus by means of which the friction wheel 97 is shifted along the shaft 96 of the regulating dynamo being omitted for the same of clearness.

The apparatus just described provides two possible means by which the operating characteristics of the power dynamo 15 can be materially affected or varied. These means are, first, the variable speed connection between the power dynamo and the regulating dynamo, and second, the adjustable rheostat 31 in the main field winding of the regulating dynamo. By varying either one of these instrumentalities separately the power dynamo can be given certain characteristics, and by varying both of these instrumentalities the power dynamo can be given still other characteristics.

Figure 12:
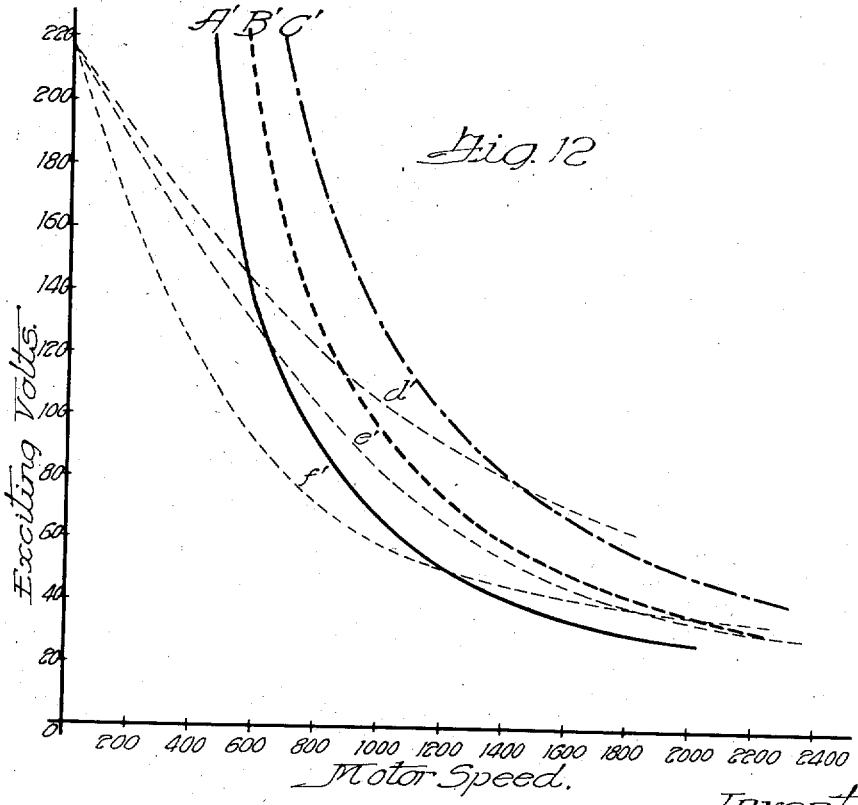
Fig. 12 is a set of curves showing certain operating characteristics of the apparatus disclosed in Fig. 11.

In Fig. 12 I have shown curves illustrating characteristic performances of the apparatus illustrated in Fig. 11. The curves A′, B′, and C′ shown in this figure correspond to the curves A, B, C of Fig. 3, except that the spacing of these curves, due to inherent drop in speed with increase in load, is effected by the series field 40, which contains a comparatively few turns. It will, of course, be understood that the number of turns in the series field 40 can be varied to give any desired inherent drop in speed with increased load.

It will, of course, be understood that the maximum rate of regeneration may be controlled by varying the number of turns in the series field 40, and that the speed range of the motor is reduced by increasing the number of turns in this field. It is therefore desirable that the number of turns in the series field 40 be restricted as much as possible in order to give the motor a wide speed range.

The power dynamo and the regulating dynamo, of which the curves shown in Fig. 12 are characteristic curves, have substantially the same maximum speed, namely 1800 R. P. M. The curves $d'$, $e'$ show the voltages generated by the regulating dynamo at various speeds, the curve $d'$ corresponding to one setting of the rheostat, and the curve $e'$ corresponding to another setting of the rheostat, which gives top speed at one-third of the rated load of the motor. The curves $d'$ and $e'$ are obtained with a one to one speed ratio between the power dynamo and the regulating dynamo. The curve $f'$ shows the generated volts of the regulating dynamo with a rheostat setting corresponding to the setting required to give curve $d'$, but with a speed ratio of two to one between the regulating dynamo, and the power dynamo; that is, when the regulating dynamo is operating at twice the speed of the power dynamo.

With a speed ratio between the dynamo and motor of one to one, and the rheostat set for line $d'$, the speed at no load is 880 R. P. M. and at full load 560 R. P. M., or the regulation is 57 per cent.

By changing the setting of the rheostat to that shown by line $e'$, the speed at no load is 2200, and at full load 620, and the regulation is 255 per cent. This shows that the motor slows down due to load relatively more at high speed than at low speed, just the same as a series motor. If now, with a rheostat setting corresponding to line $d'$, instead of changing the rheostat setting, the gear ratio between the power dynamo and the regulating dynamo is changed to two to one, the speed of the motor will follow along the line $f'$ with changes in load. The line $f'$ is derived from the line $d'$ by plotting for each motor speed the dynamo voltage generated at twice that speed. With this setting of the rheostat, the speed at no load is 2000 R. P. M., and at full load is 1200 R. P. M., and the regulation is 66 per cent. It will be noted that the curves $e'$ and $f'$ intersect at approximately 1800 R. P. M. This means that in actual operation either setting $e'$ or $f'$ will drive this particular power dynamo at full speed, namely 1800 R. P. M., and 33 per cent. of rated load.

In going from this load to full load with setting $f'$ the change in speed is 600 R. P. M. or 50 per cent. of its speed at full load. With line $e'$ the change in speed is 1180 R. P. M. or 190 per cent. of its speed at full load.

From the above it will be seen that the setting $f'$ gives a motor characteristic similar to that of a compound motor. Setting $e'$ gives a characteristic similar to that of a series motor.

With the setting $e'$ when the load is increased from one-third to full load, the speed drops to one-third its value at one-third of full load. At the same time the voltage over the shunt field increases from approximately 38 volts to approximately 124 volts, or $3\frac{1}{3}$ times its value at $\frac{1}{3}$ load. If the armature resistance is comparatively low, the ohmic drop due to armature resistance may be neglected, and especially if the motor is an interpole motor, for the reason that the interpoles will more than compensate for the armature drop. The drop in speed to one-third its maximum full load speed must necessarily mean that the flux in the field is three times its value at one-third full load. The increase in voltage over the shunt field alone would not produce this increase in flux due to magnetic saturation. The additional ampere turns required to produce this increase in flux are supplied by the series field 40. With the setting $e'$ the torque increases with the square of the current throughout the speed range of the motor. This is considerably more than can be accomplished with a series motor. In order to give the power dynamo 15 the characteristic of a shunt motor, it is necessary to overcome the effect of the series field winding 40, and for this means I provide a switch 40′, which can be used for short circuiting the series field winding 40, and thus neutralizing its effect. The only drop in speed with increase in load which can then occur must be due to the armature drop, and since the armature resistance is very low, the effect of the armature drop upon the speed of the motor will be practically *nil*.

The use of the regulating dynamo to give the power dynamo, when functioning as a motor, the characteristics of a shunt motor, presents certain advantages over the use of an ordinary shunt motor in combination with a rheostat by means of which its speed can be varied. With the ordinary shunt motor and a rheostat, there is a constant loss in the rheostat, this loss being comparatively small at high speed but quite considerable at low speeds, depending upon the size of the shunt field current. With my apparatus the regulating dynamo really functions as a motor to help carry the load of the power dynamo when functioning as a motor, and the only losses occasioned by its use being due to the usual internal losses in a motor.

While I have illustrated and described certain embodiments of my invention, I am aware that there are many other modifications of my invention which I have neither illustrated nor described, but all of which embody the fundamental principles of the embodiments illustrated and described; and while I have described my invention as applied to the driving of motor vehicles and other similar apparatus, I am aware that it is applicable to many phases of the electrical industry, and may be adapted to many and varied purposes. My invention is not, therefore, to be limited to the particular embodiments illustrated and described, nor to be limited in its application to the fields specifically referred to in the foregoing description of its construction and operation.

In describing my apparatus and its operation I have made use of certain curves illustrating certain of its operating characteristics. These curves merely illustrate the operating characteristics of a combination of a certain power dynamo and regulating dynamo and certain auxiliary control apparatus, and it must be clearly understood that by changing the characteristics of these various elements the operating characteristics of the entire apparatus can be varied between wide limits. It is therefore to be clearly understood that my invention is not limited in any way except by the scope of the appended claims.

Having thus described my invention, what I claim is:

1. The combination with a motor comprising a series field winding and a shunt field winding, of a regulating dynamo connected in series with said shunt field winding to oppose the potential impressed on said shunt field winding, a field winding for said regulating dynamo connected in shunt to said motor shunt field winding, an adjustable rheostat connected in series with said regulating dynamo field winding, a second field winding for said regulating dynamo, opposing said first-named regulating dynamo field winding, the said second field winding being connected in shunt to said motor shunt field winding, means for causing said motor and dynamo to rotate at speeds bearing a constant ratio to each other, and means for varying said ratio.

2. The combination with a motor having a shunt field winding, of a regulating dynamo connected in series with said shunt field winding to oppose the potential impressed on said shunt field winding, a field winding for said regulating dynamo connected in shunt to said motor shunt field winding, an adjustable rheostat connected in series with said regulating dynamo field winding, a second field winding for said regulating dynamo opposing said first-named regulating dynamo field winding, the said second field winding being connected in shunt to said motor shunt field winding, means for causing said motor and dynamo to rotate at speeds bearing a constant ratio to each other, and means for varying the ratio.

3. The combination with a motor having a shunt field winding, of a regulating dynamo connected in series with said shunt field winding to oppose the potential impressed on said shunt field winding, a field winding for said regulating dynamo connected in shunt to said motor shunt field winding, an adjustable rheostat connected in series with said regulating dynamo field winding, a second field winding for said regulating dynamo opposing said first-named regulating dynamo field winding, means for causing said motor and dynamo to rotate at speeds bearing a constant ratio to each other, and means for varying the ratio.

4. The combination with a motor having a shunt field winding, of a regulating dynamo connected in series with said shunt field winding, to oppose the potential impressed on said shunt field winding, a field winding for said regulating dynamo, means for supplying exciting current to said regulating dynamo field winding at a rate constantly proportional to the flow of current in said shunt field winding, an adjustable rheostat connected in series with said regulating dynamo field winding, means for causing said motor and dynamo to rotate at speeds bearing a constant ratio to each other, and means for varying said ratio.

5. The combination with a motor having a shunt field winding, of a regulating dynamo connected in series with said shunt field winding to oppose the potential impressed on said shunt field winding, a field winding for said regulating dynamo, means for supplying current to said regulating dynamo field winding at a rate constantly proportional to the flow of current in said shunt field winding, means for causing said motor and dynamo to rotate at speeds bearing a constant ratio to each other, and means for varying said ratio.

6. The combination with a motor having a field winding, of a regulating dynamo connected in series with said field winding to form a field winding circuit, means for impressing a potential upon said field winding circuit in opposition to the counter-electromotive force of said regulating dynamo, a field winding for said regulating dynamo connected in shunt to a portion of said motor field winding, an adjustable rheostat connected in series with said regulating dynamo field winding, means for causing said motor and dynamo to rotate at speeds bearing a constant ratio to each other, and means for varying said ratio.

7. The combination with a motor having a field winding, of a regulating dynamo connected in series with said field winding to form a field winding circuit, means for impressing a constant voltage on said field winding circuit to oppose the counter-electromotive force of said regulating dynamo, said regulating dynamo having a magnetic field circuit, means for causing said regulating dynamo to operate at a speed bearing a constant ratio to the speed of said motor, selective means for changing said ratio, and means for initially increasing the flux in said regulating dynamo magnetic field circuit to increase the speed of said motor, and for subsequently decreasing said flux to cause the speed of said motor to continue to increase.

8. The combination with a motor having a shunt field winding, of a regulating dynamo connected in series with said shunt field winding to oppose the potential impressed on said shunt field winding, a magnetic field circuit for said regulating dynamo, adjustable means for creating a flux in said magnetic field circuit which initially increases to increase the speed of said motor, and subsequently decreases to further increase the speed of said motor, and means for varying the rate at which said flux increases and decreases with respect to the speed of said motor.

9. The combination with a dynamo having a field winding, of means for impressing a voltage on said field winding, a regulating dynamo connected in series with said field winding. and opposing the voltage impressed thereon, said regulating dynamo having a magnetic field circuit, means for creating a magneto-motive force for creating a magnetic flux in said magnetic field circuit, other means for varying said magneto-motive force, means for causing said regulating dynamo to operate at a speed bearing a constant ratio to the speed of said first-named dynamo, and means for varying said ratio.

10. The combination with a motor having a commutating field winding and a shunt field winding, of a regulating dynamo connected in series with said shunt field winding to oppose the potential impressed on said shunt field winding, a field winding for said regulating dynamo connected in shunt to said motor shunt field winding, an adjustable rheostat connected in series with said regulating dynamo field winding, means for causing said motor and dynamo to rotate at speeds bearing a constant ratio to each other, and means for causing said motor to slow down under load, comprising a field winding forming a part of said armature circuit.

11. The combination with a motor having a shunt field winding, of a regulating dynamo connected in series with said shunt field winding to oppose the potential impressed on said shunt field winding, a field winding for said regulating dynamo connected in shunt to said motor shunt field winding, an adjustable rheostat connected in series with said regulating dynamo field winding, means for causing said motor and dynamo to rotate at speeds bearing a constant ratio to each other, and means for causing said motor to slow down under load.

12. The combination with a motor having a field winding, of a regulating dynamo connected in series with said field winding to form a field winding circuit, means for impressing a substantially constant potential on said field winding circuit, a field winding for said regulating dynamo, means for supplying current to said regulating dynamo field winding, at a rate constantly proportional to the rate of flow of current through said motor field winding, an adjustable rheostat connected in series with said regulating dynamo field winding, means for causing said motor and dynamo to rotate at speeds bearing a constant ratio to each other, and means forming a part of said motor and responsive to increase in load, for reducing the speed of said motor.

13. The combination with a motor having a magnetic field circuit and a field winding for said magnetic field circuit, of a regulating dynamo connected in series with said field winding to form a field winding circuit, means for impressing a potential on said field winding circuit in opposition to the counter-electromotive force of said regulating dynamo, a field winding for said regulating dynamo, means for supplying current to said regulating dynamo field winding at a rate constantly proportional to the rate of flow of current in said motor field winding, an adjustable rheostat connected in series with said regulating dynamo field winding, means for causing said motor and dynamo to rotate at speeds bearing a constant ratio to each other, and other means responsive to increase in load, for increasing the flux in said magnetic field circuit.

14. The combination with a motor having a magnetic field circuit, and a field winding for said magnetic field circuit, of a regulating dynamo connected in series with said field winding to form a field winding circuit, means for impressing a voltage on said field winding circuit in opposition to the counter-electromotive force of said regulating dynamo, a field winding for said regulating dynamo, means for supplying current to said field winding at a rate constantly proportional to the rate of flow of current in said motor field winding, an adjustable rheostat connected in series with said regulating dynamo field winding, means for causing said motor and dynamo to rotate at speeds bearing a constant ratio to each other, and other means responsive to increase in load for causing said motor to slow down.

15. The combination with a motor having a magnetic field circuit and a field winding for inducing a flux in said magnetic field circuit, of a regulating dynamo connected in series with said field winding to form a field winding circuit, means for impressing a substantially constant potential on said field winding circuit, a field winding for said regulating dynamo, means for supplying current to said regulating dynamo field winding at a rate constantly proportional to the flow of current in said motor field winding, means for causing said motor and dynamo to rotate at speeds bearing a constant ratio to each other, and other means forming a part of said motor and responsive to increase in load for increasing the flux in said magnetic field circuit for reducing the speed of said motor.

16. The combination with a motor having a field winding, of a regulating dynamo connected in series with said field winding to form a field winding circuit, means for impressing a substantially constant potential on said field winding circuit, a field winding for said regulating dynamo distinct from said armature circuit, means for supplying current to said regulating dynamo field winding at a rate constantly proportional to the rate of flow of current through said motor field winding, means for adjusting the ratio of the current flowing in said field windings, means for causing said motor and dynamo to rotate at speeds bearing a constant ratio to each other, and means responsive to increase in load, for reducing the speed of said motor.

17. The combination with a motor having a field winding, of a regulating dynamo connected in series with said field winding, to form a field winding circuit, means for impressing a constant potential upon said field winding circuit in opposition to the counter-electromotive force of said regulating dynamo, a magnetic circuit for said regulating dynamo, a field winding for said regulating dynamo for creating flux in said magnetic circuit, an adjustable rheostat connected in series with said regulating dynamo field winding, and means for reversing the flux through said magnetic circuit when said motor is operating at substantially its lowest running speed, comprising a second field winding for said regulating dynamo, opposing said first-named regulating dynamo field winding, the said second field winding being connected in shunt to said motor shunt field winding, and means for causing said motor and dynamo to rotate at speeds bearing a constant ratio to each other.

18. The combination with a motor having a field winding, of a regulating dynamo connected in series with said field winding, to form a field winding circuit, means for impressing a constant potential upon said field winding circuit in opposition to the counter-electromotive force of said regulating dynamo, a magnetic circuit for said regulating dynamo, a field winding for said regulating dynamo for creating flux in said magnetic circuit, and means for reversing the flux through said magnetic circuit when said motor is operating at substantially its lowest running speed, comprising a second field winding for said regulating dynamo, opposing said first-named regulating dynamo field winding, the said second field winding being connected in shunt to said motor shunt field winding, and means for causing said motor and dynamo to rotate at speeds bearing a constant ratio to each other.

19. The combination with a motor having a field winding, of a regulating dynamo connected in series with said field winding, to form a field winding circuit, means for impressing a constant potential upon said field winding circuit in opposition to the counter-electromotive force of said regulating dynamo, a magnetic circuit for said regulating dynamo, a field winding for said regulating dynamo for creating flux in said magnetic circuit, means for reversing the flux through said magnetic circuit when said motor is operating at substantially its lowest running speed, comprising a second field winding for said regulating dynamo, opposing said first-named regulating dynamo field winding, and means for causing said motor and dynamo to rotate at speeds bearing a constant ratio to each other.

20. The combination with a motor having a field winding, of a regulating dynamo connected in series with said field winding, to form a field winding circuit, means for impressing a constant potential upon said field winding circuit in opposition to the counter-electromotive force of said regulating dynamo, a magnetic circuit for said regulating dynamo, a field winding for said regulating dynamo for creating flux in said magnetic circuit, means for reversing the flux through said magnetic circuit when said motor is operating at substantially its lowest running speed, comprising a second field winding for said regulating dynamo, opposing said first-named regulating dynamo field winding, means for supplying current to said second field winding at a rate constantly proportional to the rate of flow of current in said motor field winding, and means for causing said motor and dynamo to rotate at speeds bearing a constant ratio to each other.

21. The combination with a motor having a field winding, of a regulating dynamo connected in series with said field winding to form a field winding circuit, means for impressing a constant potential upon said field winding circuit in opposition to the counter-electromotive force of said regulating dynamo, a magnetic circuit for said regulating dynamo, a field winding for creating flux in said magnetic circuit, means for supplying current to said regulating dynamo field winding at a rate constantly proportional to the flow of current in said motor field winding, and means for reversing the flux through said magnetic circuit.

22. The combination with a motor having a field winding, of a regulating dynamo connected in series with said field winding, to form a field winding circuit, means for impressing a potential upon said field winding circuit in opposition to the counter-electromotive force of said regulating dynamo, means for reducing the opposition of said dynamo to said last named means, to zero to cause said motor to operate at a low speed, and for subsequently increasing the potential across said motor field winding to cause it to operate at a still lower running speed, and means for maintaining the speed of said regulating dynamo constantly proportional to the speed of said motor.

23. The combination with a motor having an armature circuit and a field winding circuit, comprising a regulating dynamo, of means for impressing a potential on said field winding circuit in the same direction as the voltage of said regulating dynamo for starting said motor, means for reversing the voltage of said dynamo for accelerating said motor, and means for driving said regulating dynamo at a speed constantly proportional to the speed of said motor.

24. The combination with a motor having an armature circuit and a field winding circuit, comprising a regulating dynamo, of means for impressing a potential on said field winding circuit in the same direction as the voltage of said regulating dynamo, a field winding for said regulating dynamo, means for supplying current to said regulating dynamo field winding at a rate constantly proportional to the flow of current in said field winding circuit and means for reversing the voltage of said dynamo.

25. The combination with a dynamo for functioning either as a motor or a generator, and having a shunt field winding, of a regulating dynamo, having its armature connected in series with said shunt field winding to form a field winding circuit, said field winding circuit being connected across the terminals of said first-named dynamo and the regulating dynamo being so connected with the shunt winding as to oppose the voltage impressed on said terminals, a field winding for said regulating dynamo connected in shunt to a portion of said field winding circuit, and a driving connection between said dynamo and said regulating dynamo, for driving said regulating dynamo at any desired speed relative to the speed of said first-named dynamo.

26. The combination with a dynamo for functioning either as a motor or a generator, and having a shunt field winding, of a regulating dynamo having its armature connected in series with said shunt field winding to form a field winding circuit, said field winding circuit being connected across the terminals of said first-named dynamo and the regulating dynamo being so connected with the shunt field winding as to oppose the voltage impressed on said terminals, a field winding for said regulating dynamo connected in shunt to a portion of said field winding circuit, and means for driving said regulating dynamo at various speeds relative to the speed of said first-named dynamo, the said last-named means embodying means for maintaining a constant proportionality between the speeds of the two dynamos at whatever speed they are driven.

27. The combination with a dynamo for functioning either as a motor or a generator, and having a field winding, of means for impressing a varying voltage upon said winding, comprising a second dynamo connected in series with said field winding, and means for driving said second dynamo at speeds bearing a constant ratio to the speed of said first-named dynamo, and means for varying said ratio.

28. The combination with a dynamo for functioning either as a motor or a generator, and having a field winding energized by a source of current, of a second dynamo having its armature connected with said field winding and said source of current to regulate the flow of current through said field winding, means for causing said second dynamo to operate at speeds bearing a constant ratio to the speed of said first named dynamo, and manually controlled means for varying the speed of said second dynamo relative to the speed of said first-named dynamo electric machine.

29. The combination with a motor having a shunt field winding, of a regulating dynamo connected in series with said shunt field winding, so as to oppose voltage imposed on said shunt field winding, means for driving said regulating dynamo at a plurality of different speeds, each speed having a constant ratio to the speed of said motor, and manually controlled means for controlling said last-named means.

30. The combination with a motor having a shunt field winding, of a regulating dynamo connected in series with said shunt field winding, so as to oppose voltage imposed on said shunt field winding, means for driving said regulating dynamo at a plurality of different speeds, each speed having a constant ratio to the speed of said motor, and means for varying said ratio.

31. The combination with a motor having a shunt field winding, of a regulating dynamo connected in series with said shunt field winding, so as to oppose voltage imposed on said shunt field winding, and means for driving said regulating dynamo at a plurality of different speeds, relative to the speed of said motor, each speed having a constant ratio to the speed of said motor.

32. The combination with a power dynamo having a shunt field winding, of a regulating dynamo having its armature connected in series with the shunt field winding of said power dynamo, so that the voltage generated by said armature opposes the voltage impressed on the shunt field of said power dynamo, the field winding of said regulating dynamo being connected in parallel with the shunt field winding of said power dynamo, an adjustable resistance connected in series with the field of said regulating dynamo, and means for driving said regulating dynamo at a speed bearing a constant proportionality to the speed of said power dynamo.

33. The combination with a power dynamo having a shunt field winding, of a regulating dynamo having its armature connected in series with said shunt field winding so as to oppose the voltage impressed on said shunt field winding, the said regulating dynamo being provided with a field winding connected around the shunt field winding of said power dynamo, an adjustable resistance connected in series with the field winding of said regulating dynamo, and means for driving said regulating dynamo at a speed having a constant proportionality to the speed of the power dynamo.

34. The combination with a power dynamo having a shunt field winding, of a regulating dynamo having its armature connected in series with the shunt field winding of said power dynamo so as to oppose the voltage imposed on said shunt field winding, the field winding of said regulating dynamo being connected around the shunt field winding of said power dynamo, manually controlled means for varying the voltage of said regulating dynamo, and means for driving said regulating dynamo at a plurality of speeds relative to the speed of said power dynamo, each speed having a constant proportionality to the speed of the power dynamo.

35. The combination of a power dynamo having a shunt field winding, of a regulating dynamo having a field winding, means for maintaining a current in the field winding of said regulating dynamo proportional to the current in said field winding, the armature of said regulating dynamo being connected in series with the shunt field winding of said power dynamo so as to oppose the voltage imposed on said shunt field winding, means for driving said dynamo at a plurality of speeds relative to the speed of said power dynamo, each speed having a constant proportionality to the speed of said power dynamo, and manually controlled means for varying the voltage of said regulating dynamo.

36. The combination with a motor having a field winding, of a regulating dynamo having its armature connected in series with said field winding to form a field winding circuit, means for impressing a constant potential upon said field winding circuit in a direction opposite to the counter-electromotive force of said regulating dynamo, a field winding for said regulating dynamo connected in shunt of said motor field winding, an adjustable rheostat connected in series with said regulating dynamo field winding, and means for causing said regulating dynamo armature to rotate at a speed constantly proportional to the speed of said motor armature.

37. The combination with a motor having a field winding, of a regulating dynamo having its armature connected in series with said field winding to form a field winding circuit, means for impressing a constant potential upon said field winding circuit in a direction opposite to the counter-electromotive force of said regulating dynamo, a field winding for said regulating dynamo, connected in shunt of a portion of said field winding circuit, an adjustable rheostat in series with said regulating dynamo field winding, and means for causing the armature of said regulating dynamo to rotate at a speed constantly proportional to the speed of said motor.

38. The combination with a main dynamo having a field winding, of a regulating dynamo connected in series with said field winding, to form a field winding circuit, means for impressing a constant potential on said field winding circuit in a direction to oppose the counter-electromotive force of said regulating dynamo, a field winding for said regulating dynamo, means distinct from the armature circuit of said dynamo for supplying current to said regulating dynamo field winding at a rate bearing a constant ratio to the flow of current in said main dynamo field winding, and means for varying the ratio of the currents flowing in said field windings.

39. The combination with a dynamo for functioning either as a motor or a generator having a field winding, of means for impressing a varying voltage upon said field winding, comprising a second dynamo connected in series with said field winding, and driving connections between said dynamo and said second dynamo for driving said second dynamo at different speeds relative to the speed of said first-named dynamo, each constantly proportional to the speed of said first-named dynamo.

40. The combination with a motor having a field winding, of a regulating dynamo connected in series with said field winding, to form a field winding circuit, means for impressing a substantially constant voltage on said field winding circuit to oppose the counter-electromotive force of said regulating dynamo, and means for inherently causing the voltage of said regulating dynamo initially to increase at a greater rate than the rate at which the speed of said motor increases, and subsequently to increase at a lesser rate than the rate at which the speed of said motor continues to increase.

41. The combination with a motor having a field winding, of a regulating dynamo connected in series with said field winding, to form a field winding circuit, means for impressing a constant voltage on said field winding circuit to oppose the counter-electromotive force of said regulating dynamo, said regulating dynamo having a magnetic field circuit, means for causing said regulating dynamo to operate at a speed constantly proportional to the speed of said motor, and means for initially increasing the flux in said regulating dynamo magnetic field circuit to increase the speed of said motor and for subsequently decreasing said flux to cause the speed of said motor to continue to increase.

42. A motor comprising an armature circuit, a magnetic field circuit, means for inducing a flux in said magnetic field circuit, comprising a field winding, a regulating dynamo having its armature connected in series with said field winding to form a field winding circuit, means for imposing a constant potential across said field winding circuit in a direction opposite to the counter-electromotive force of said regulating dynamo, a field winding circuit for said regulating dynamo, containing an adjustable rheostat, means for driving the armature of said regulating dynamo at a speed bearing a constant ratio to the speed of said motor, and means for supplying an exciting current to said regulating dynamo field winding circuit at a rate decreasing with increase in the speed of said motor, and vice versa.

43. A motor comprising an armature circuit, a magnetic field circuit, means for inducing a flux in said magnetic field circuit, comprising a field winding, a regulating dynamo having its armature connected in series with said field winding to form a field winding circuit, means for imposing a constant potential across said field winding circuit in a direction opposite to the counter-electromotive force of said regulating dynamo, a field winding circuit for said regulating dynamo, means for driving the armature of said regulating dynamo at a speed bearing a constant ratio to the speed of said motor, means for supplying an exciting current to said regulating dynamo field winding circuit at a rate decreasing with increase in the speed of said motor, and vice versa, and means for adjusting the strength of said exciting current.

44. The combination with a main dynamo comprising an armature circuit and means for establishing a magnetic field for said main dynamo, of a regulating dynamo comprising adjustable means for opposing said last-named means, for varying said magnetic field, the said regulating dynamo comprising means for establishing a magnetic field for said regulating dynamo, and means for varying said last-named magnetic field in the same direction that said first-named magnetic field varies for any one setting of said adjustable means, said means being distinct from said armature circuit.

45. A dynamo having a magnetic field circuit, an armature circuit, and a field winding for inducing a flux in said magnetic field circuit, adjustable means distinct from said armature circuit for giving said flux a plurality of values, and means for increasing said flux above each adjusted value with increase of load, while functioning as a motor.

46. A motor having a field winding and an armature circuit, means for impressing a voltage over said field winding, adjustable means distinct from said armature circuit for giving said voltage a plurality of values and for causing said voltage to increase above each adjusted value with increase of load, the said last named means comprising means for preventing said voltage from reaching zero when the speed of said motor is increased more than one hundred per cent. above its lowest running speed.

47. A dynamo having a magnetic field circuit, and an armature circuit, a field winding for inducing a flux in said magnetic field circuit, adjustable means distinct from said armature circuit for giving said flux a plurality of values, and for increasing said flux above each adjusted value with increase of load, and means to prevent said flux from reaching zero value.

48. The combination with a dynamo having a field winding and an armature circuit, of means for impressing a voltage on said field winding, a regulating dynamo connected in series with said field winding and opposing the voltage impressed thereon, the said regulating dynamo having a magnetic field circuit, means distinct from said armature circuit for creating a magnetic flux in said magnetic field circuit, and other means for adjusting said flux.

49. The combination with a motor having an armature circuit and a magnetic field circuit, of means for inducing a flux in said magnetic field circuit, comprising a dynamo having a magnetic field circuit, means for creating a flux in said dynamo magnetic field circuit, means for increasing the flux in said dynamo magnetic field circuit until said motor armature reaches a speed which is not greater than twice the speed at no load and full field, and for then decreasing the flux in said dynamo magnetic field circuit to further increase the speed of said motor.

50. A dynamo having a magnetic field circuit and an armature circuit, means for inducing a flux in said magnetic field circuit, adjustable means distinct from said armature circuit for giving said flux a plurality of values, and means for increasing said flux above each adjusted value, with increase of load, and means for giving the dynamo, while functioning as a motor, a speed range greater than two to one.

51. The combination with a motor having a field winding, of a regulating dynamo connected in series with said field winding to form a field winding circuit, means for impressing a potential on said field winding circuit in opposition to the counter-electromotive force of said regulating dynamo, means for driving said motor and dynamo at speeds bearing a constant ratio to each other, the said regulating dynamo having a magnetic field circuit, means for inducing a flux in said magnetic field circuit, and means for controlling the flux in said magnetic field circuit to cause said motor to operate at stable speeds when the counter-electromotive force of said regulating dynamo exceeds one-half the value of said potential.

52. The combination with a motor having a shunt field winding, of a regulating dynamo connected in series with said shunt field winding to form a shunt field winding circuit, the said regulating dynamo being connected with said shunt winding so as to oppose the voltage impressed on the shunt field of said motor, means for driving said motor and dynamo at speeds bearing a constant ratio to each other, said regulating dynamo having a magnetic field circuit, means for inducing a flux in said magnetic field circuit, and means for controlling the flux in said magnetic circuit to cause said motor to operate at stable speeds when the counter-electromotive force of said regulating dynamo exceeds one-half the value of the potential impressed on said field winding circuits.

53. The combination with a motor having a field winding, of a regulating dynamo connected in series with said field winding to form a field winding circuit, means for impressing a potential on said field winding circuit in opposition to the counter-electromotive force of said regulating dynamo, means for driving said motor and dynamo at speeds bearing a constant ratio to each other, the said regulating dynamo having a magnetic field circuit, means for inducing a flux in said magnetic field circuit, and means for controlling the flux in said magnetic field circuit to cause said motor to operate at stable speeds when the counter-electromotive force of said regulating dynamo exceeds the voltage over said field winding.

54. The combination with a motor having a magnetic field circuit, of means for causing said motor to have the characteristics of a variable speed motor, comprising means for magnetizing said magnetic field circuit, a regulating dynamo connected to oppose said magnetizing means, means for adjusting the opposition of said regulating dynamo, and means for maintaining the resultant magnetization always greater than zero.

55. The combination with a motor having an armature circuit and a field winding circuit, of a single source of current for supplying current to said armature circuit and said field winding circuit, and selective means for controlling the flow of current through said field winding circuit to give said motor characteristics similar to a shunt motor, a series motor, or a compound motor.

56. The combination with a motor having an armature circuit and a shunt field circuit, of a source of current for supplying current to said circuits, and means for controlling the flow of current through said shunt field circuit to cause said motor to have operating characteristics similar to a shunt motor or a series motor.

In witness whereof I hereunto subscribe my name this 9th day of May, 1919.

LEIGH J. STEPHENSON.